United States Patent
Harris et al.

(10) Patent No.: US 6,578,694 B2
(45) Date of Patent: Jun. 17, 2003

(54) DISCHARGE CHUTE CONTROL SYSTEM

(75) Inventors: Thomas J. Harris, Dodge Center, MN (US); Ted M. Daly, Kasson, MN (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 91 days.

(21) Appl. No.: 09/785,903

(22) Filed: Feb. 16, 2001

(65) Prior Publication Data

US 2002/0112936 A1 Aug. 22, 2002

(51) Int. Cl.[7] .............................................. B65G 11/00
(52) U.S. Cl. ................ 193/16; 193/6; 193/4; 193/22
(58) Field of Search .............................. 193/4, 5, 6, 16, 193/22

(56) References Cited

U.S. PATENT DOCUMENTS

| | | |
|---|---|---|
| 3,410,538 A | 11/1968 | Potter |
| 3,633,719 A | 1/1972 | Lynch |
| 3,828,949 A | 8/1974 | Spellman |
| 4,047,604 A | 9/1977 | Daoust et al. |
| 4,190,144 A | 2/1980 | Lybbert |
| 4,273,231 A * | 6/1981 | Hodneland ................... 193/10 |
| 4,276,975 A | 7/1981 | Jenkins |
| 4,318,612 A | 3/1982 | Lawrence et al. |
| 4,409,748 A * | 10/1983 | Westimayer ................... 193/22 |
| 4,547,116 A * | 10/1985 | Legille et al. ............... 414/160 |
| 4,792,234 A | 12/1988 | Doherty |
| 4,797,056 A | 1/1989 | Gerold et al. |
| 5,035,313 A | 7/1991 | Smith |
| 5,056,641 A | 10/1991 | Loefke et al. |
| 5,104,706 A | 4/1992 | Krishnakumar et al. |
| 5,178,252 A | 1/1993 | Smith |
| 5,184,706 A | 2/1993 | Christenson |
| 5,186,299 A | 2/1993 | Stimson |
| 5,244,069 A | 9/1993 | Cosgrove |
| 5,551,776 A | 9/1996 | Zimmerman |
| 5,660,260 A | 8/1997 | Bareiss |

* cited by examiner

Primary Examiner—Douglas Hess
(74) Attorney, Agent, or Firm—Nikolai & Mersereau, P.A.; C. G. Mersereau

(57) ABSTRACT

A motor driven discharge chute control system for automatically controlling the lateral position of a concrete discharge chute associated with a transit mixer vehicle is disclosed including a reversing motor connected to an output gear normally engaged to rotate with the motor through a gear reducer. A rotating chute swing gear is driven by the output gear and rotates a connected pivot assembly that carries one end of a discharge chute. A manual override system is also provided.

15 Claims, 5 Drawing Sheets

DISCHARGE CHUTE CONTROL SYSTEM

BACKGROUND OF THE INVENTION

I. Field of the Invention

The present invention relates generally to transit mixing concrete hauling vehicles and particularly to rear discharge types which include an appended discharge chute capable of lateral directional displacement to direct discharge of concrete in a desired direction. Specifically, the invention is directed to a mechanized chute control system to automatically and controllably rotate and position of the chute as desired.

II. Related Art

Concrete transit mixing or ready-mix trucks are widely used in the construction and paving industries for preparing and transporting concrete mixtures to desired construction sites where the concrete is discharged into prepared forms or other carriers. Discharge is normally accomplished by reversing mixing drum rotation so that concrete spills from the top drum charging opening. In order to guide concrete to prepared forms, equivalent molding structures, or other receiving containers, mixing trucks in commercial use today typically employ a main discharge chute having an ability to pivot both vertically and laterally. A chute may or may not have one or more extensions. In order to withstand stresses which are created by the discharge of heavy wet concrete (approximately 4,000 pounds or 1800 kg per yard), discharge chute components need to possess a great deal of strength and are typically made of rather heavy gauge trough-shaped metal segments.

The position of the chute typically must be adjusted often during discharge operations. Vertical adjustment is accomplished with the help of attached hydraulic cylinders, however, lateral operation of the chutes has been accomplished through manual positioning and the weight of the chute and the concrete material makes the positioning difficult during use. Additionally, chute operation requires virtually the full-time attention of one crew member who could more advantageously be accomplishing other tasks.

FIG. 1 presents, in schematic perspective illustration, a typical environment or context for which the present invention is designed. In that figure, a rear discharge transit mixer vehicle is depicted discharging concrete to one side of the truck. The truck generally designated 10 is supported as by wheels 12 connected by an axle assembly 14 mounted to a body frame 16 through a heavy duty suspension system 18. The transit mixing vehicle also includes a mixing drum 20 and a hopper for charging materials to be mixed at 21. The conventional discharge chute system includes a dispenser 22 which passes concrete from opening 23 through a transition segment 30 to an inclined chute system 24, including one or more U-shaped sections 26 tapering to a distal discharge end 28.

Elevation or vertical pivoting of the chute sections 26 is controlled and powered by a pair of fluid operated cylinders 36 and 38 linked thereto in a manner that also enables free rotation of the chute from side to side. This operation is typically manual and so, together with mechanized height adjustment, enables cement 40 to be placed in the desired location as at 42.

Once positioned, an air-operated chute lock is usually used to hold the chute in place. Additionally, a manually operated spring latched handle lock which uses a pin to align holes in moving and stationary parts may also be used.

Whereas prior systems have been successful, drawbacks include the need for constant attention by operating personnel in unlocking, making lateral adjustments and re-locking the chute in place. In addition, the chutes are heavy and, as is well known throughout the industry, care must be taken in the manipulation of such devices particularly during discharge operations. Accordingly, there remains a need for a hands-off mechanized system to automatically control the lateral positioning of the chute, to free an operator for other tasks and to provide better chute disposition control.

SUMMARY OF THE INVENTION

The present invention provides controlled motorized operation of the swivel or lateral chute swinging function of concrete discharge chute operations and is susceptible of remote or local control. The chute control system of the invention allows a full 180°+ lateral chute deployment range and provides inherent positive locking at all positions using an engaged transmission. A freewheeling manual override mode is included and a conventional latch lock is also provided. The system is designed to be compatible with many existing manual systems as a retrofit upgrade.

The system includes a fluid operated (preferably hydraulic) reversing motor connected to drive a suitable gear speed reduction and transmission system which includes a drive gear that engages a rotating chute swing plate gear which predicts and controls chute side-to-side orientation in response to operation of the motor. The system gears remain engaged after operation of the motor and this provides one positive locking mechanism. A manual spring-biased shaft latch lock also can be engaged. The gears can be disengaged to provide a manual or freewheeling override when desired. It is contemplated that the motor can be operated remotely from the cab of the truck or locally with controls at the rear of the vehicle.

This summary of the invention is intended not to limit the claimed subject matter, the scope of the invention being broader than any particular example and defined by the attached claims and their equivalents.

BRIEF DESCRIPTION OF THE DRAWINGS

The above and other features and intended advantages of the invention will become apparent from consideration of the following detailed description, taken in conjunction with the accompanying drawings in which.

DETAILED DESCRIPTION

The present invention automates and improves the maneuvering of a discharge chute of the type which is adapted for guiding a concrete mixture from a discharge end of a concrete mixing truck to a desired location. This adds side-to-side control to chute elevation control which has been accomplished utilizing attached hydraulic cylinders for some time. The system of the invention adds ease and accuracy to the horizontal aspect of discharge point location without sacrificing any of the manual capabilities. The exemplary embodiment detailed in the following description is one which is designed to be compatible with and easily retrofit onto many existing models, particularly models of those manufactured by applicant's assignee.

Figure 1:
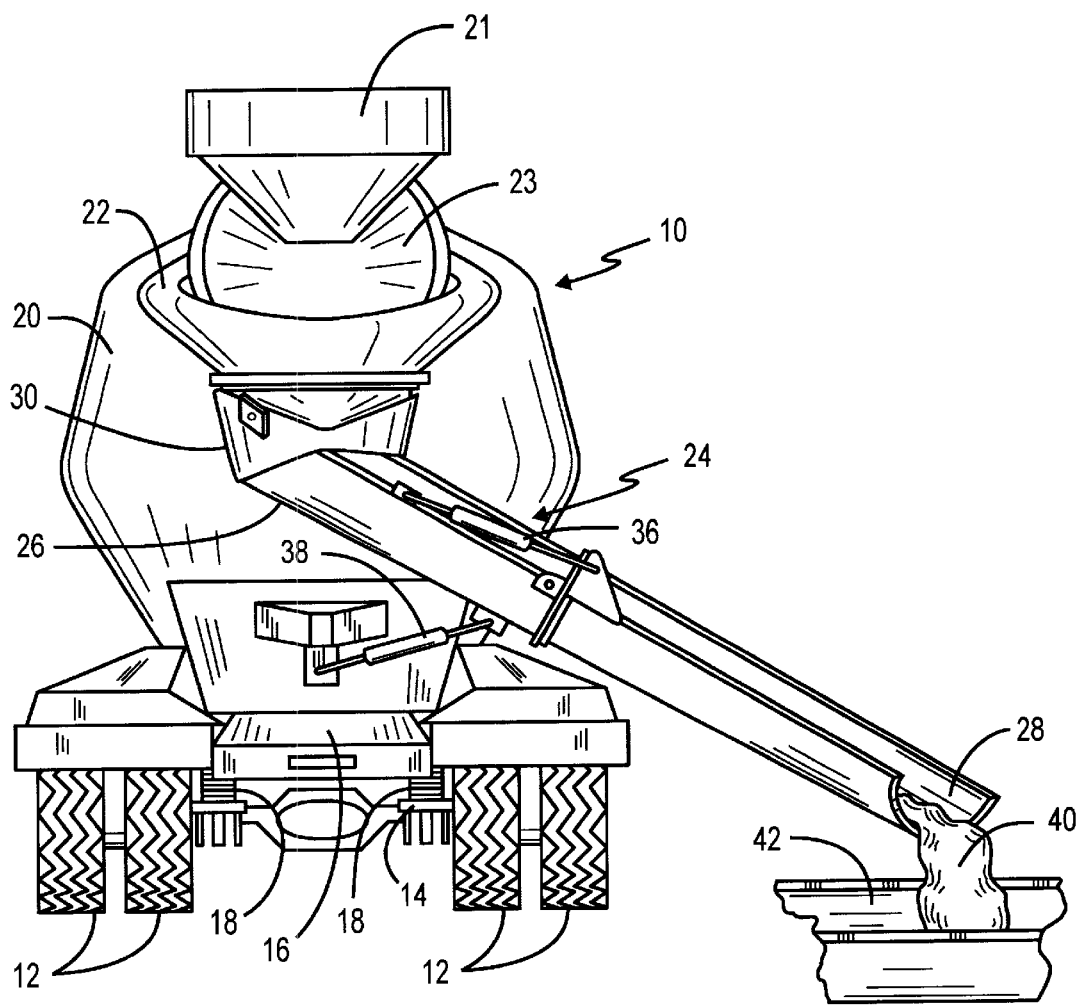
FIG. 1 shows a schematic perspective representation of a typical transit readymix truck having a manually operated swiveling discharge chute.
Figure 2:
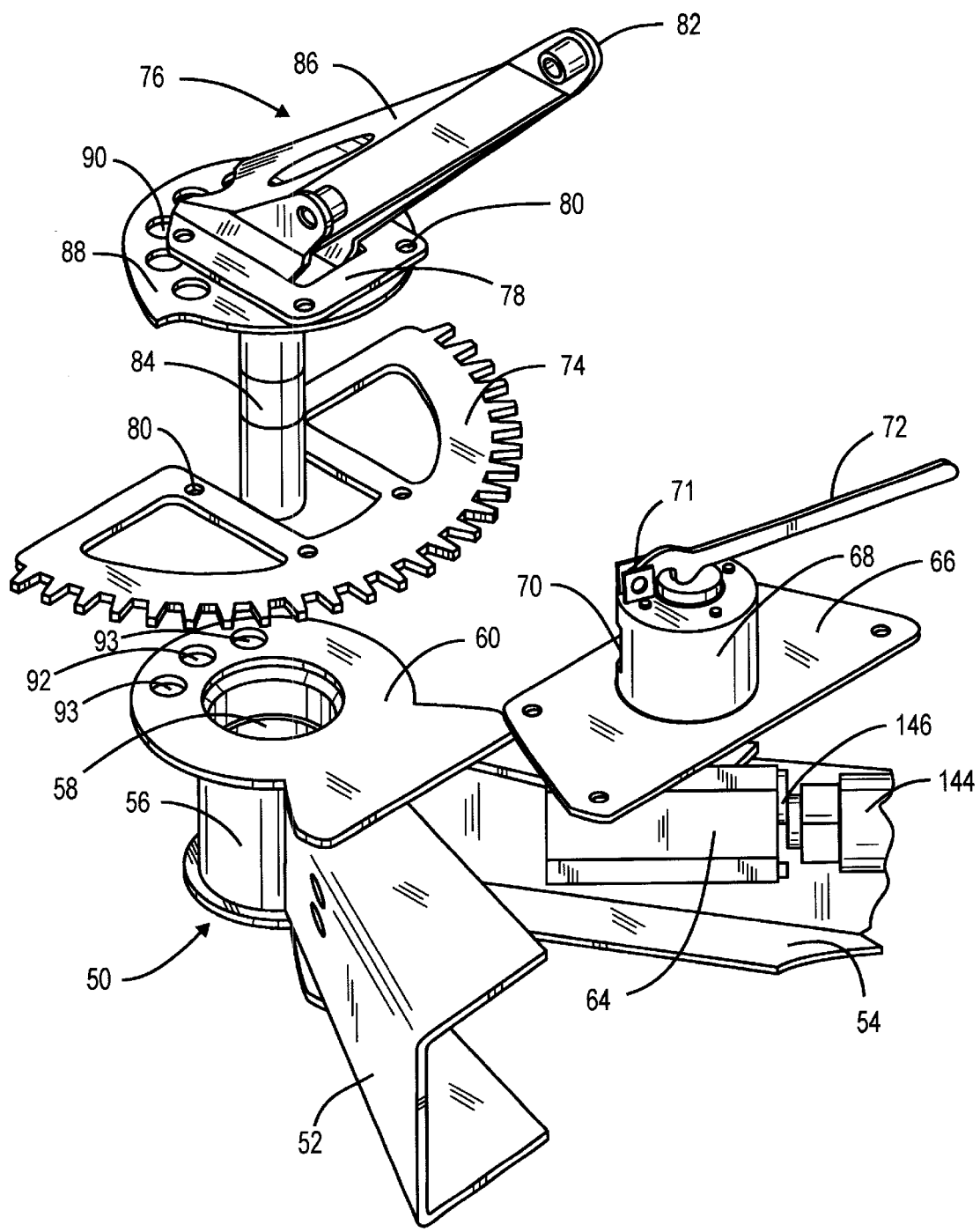
FIG. 2 is an exploded view of an embodiment of the chute control system of the invention.

With reference now to the drawing figures, the chute control mechanism is shown partially exploded in FIG. 2 and includes a stationary A-shaped bearing pivot frame 50 which is fixed to a heavy support frame carried by the truck chassis in a well known manner (not shown). This frame also supports a charging hopper above the discharge system. The bearing pivot frame 50 includes a pair of shaped structural frame members 52 and 54 which are jointed at a common tube member 56 which, in turn, describes a central bore 58. A top mounting plate 60 is fixed to the structure.

A hydraulic motor is partially shown at 144 connected to a lower gear housing 64; a mounting plate 66 and an upper gear housing 68 with front opening 70 are also part of the drive mechanism. A clutch lever 72 for disengaging the drive and allowing free wheeling of the discharge chute is shown pivotally mounted at 73. The plate 66 is designed to fix the drive components to the frame members 52 and 54. These components remain in a fixed position relative to the truck chassis at all times.

Figure 3:
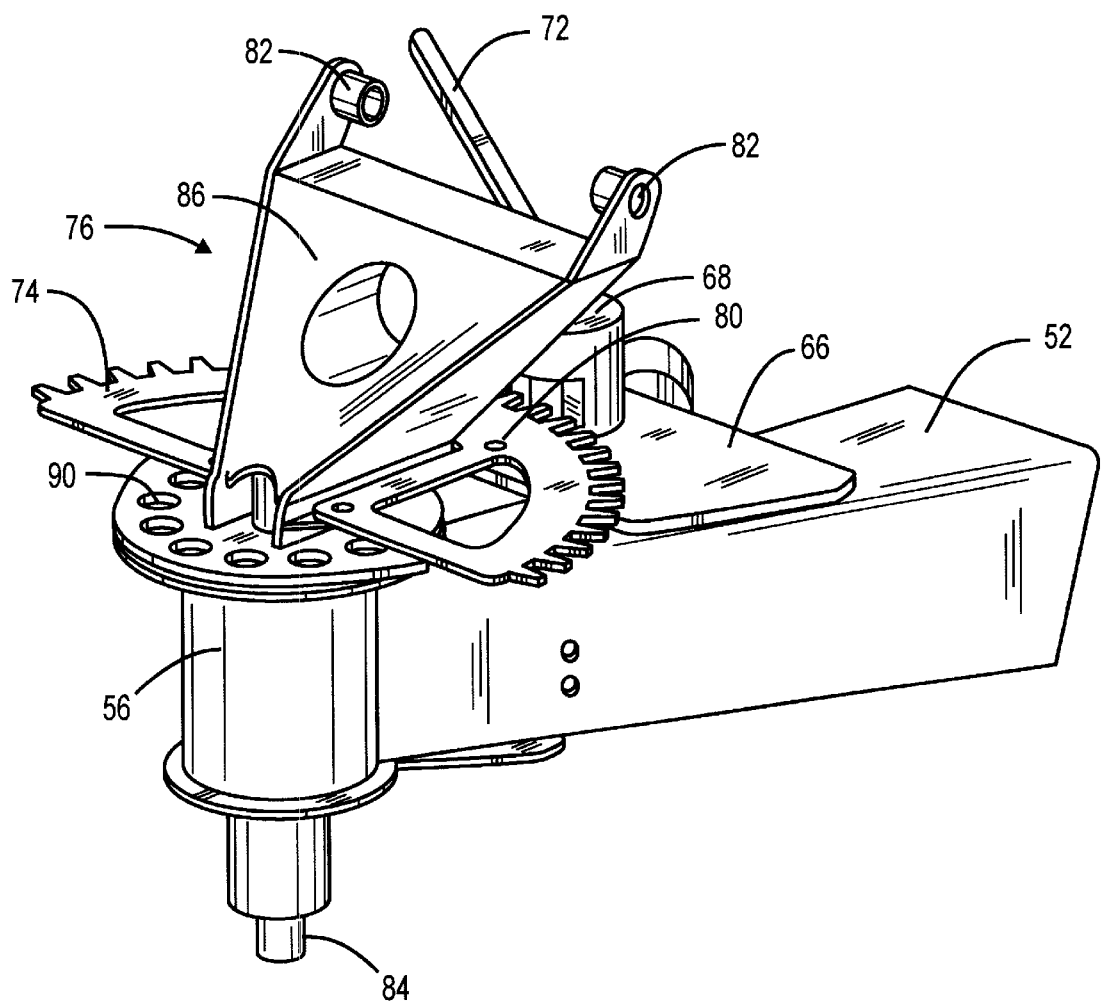
FIG. 3 is a view of the system of FIG. 2 in an assembled state.

The rotating portions of the delivery chute control system include a chute swing gear member 74 and a rear pivot assembly 76 which includes a mounting plate 78 designed to carry the swing gear member 74 using concentric mounting holes 80 (FIG. 3). The rear pivot includes a pair of heavy mounting brackets 82 for carrying a chute (not shown) in vertically pivoting relation thereto. A bearing shaft 84 is designed to be journaled in the central bore 58 so that the rear pivot assembly with the swing gear 74 are freely rotatable with respect to the fixed frame 50. The rear pivot assembly 76 also includes a stiffener plate 86 and a plate 88 having a series of spaced radially distributed holes 90 which align and misalign during rotation with a hole 92 in the stationary member 60. These aligned holes are used in conjunction with a manual locking system which will be described.

Figure 5:
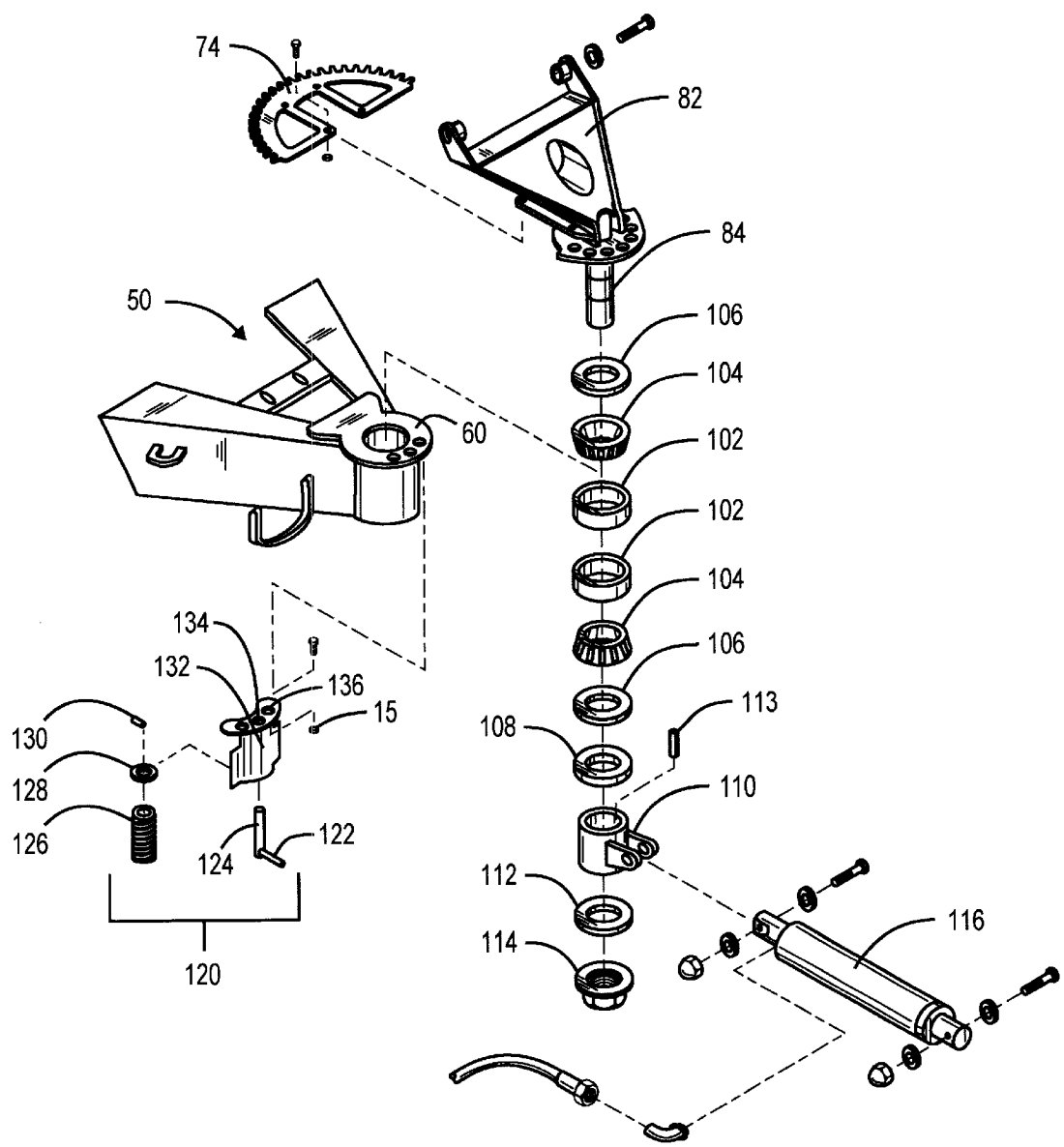
FIG. 5 is an exploded view of additional parts of the arrangement.

The pivoting or swing assembly details are further shown in the reduced exploded perspective view of FIG. 5. That view includes a bearing assembly associated with the bearing shaft 84 including a pair of bearing cups 102 adapted to contain cone swivel bearings 104 flanked by seals 106. Also carried by the shaft 84 are a spacer 108 and a chute cylinder mounting clevis 110. The assembly is secured by a pivot bottom plate 112, member 113 and a locking nut 114. A chute pivot or lift cylinder which may be single or double acting is pictured at 116. Connections are conventional.

Also pictured in FIG. 5 is a manual pivot lock assembly 120 which includes a lock handle 122 with locking member 124. A latch spring 126 with washer 128 and roll pin 130 are also pictured with associated lock housing 132. Lock housing 132 also carries a radial hole 134 which aligns with the opening 92 in the member 60. When the pivot lock housing is fixed to the member as by bolting through adjacent spaced openings 136 and 93.

Figure 4:
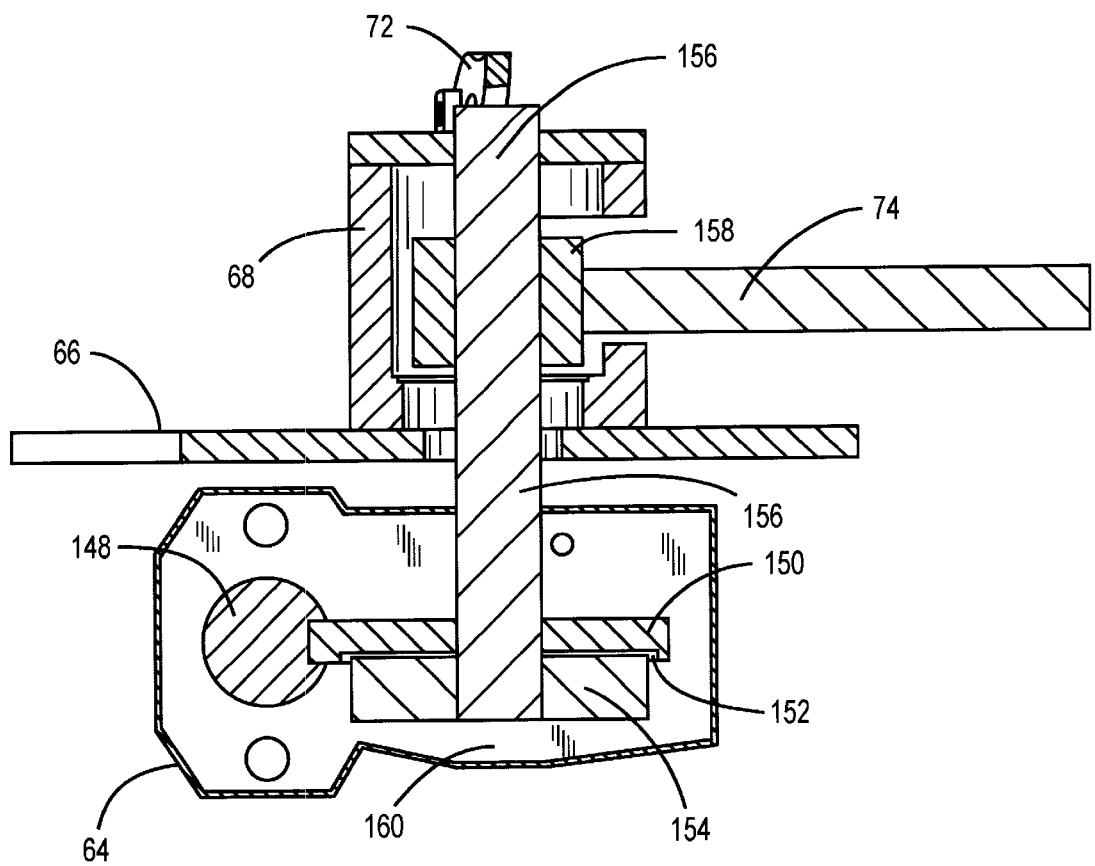
FIG. 4 is a schematic view partially in section showing a drive system for the embodiment of FIGS. 2 and 3.

FIG. 4 is a side elevational schematic view partially in section through the power drive system. The system includes a hydraulic motor 144 (FIG. 2) having an output shaft 146 keyed to a worm gear shaft 148 which is the input to a speed reducer or gear box 64. A worm gear which enmeshes with and drives a first planetary gear 150 which also has an inner ring gear aspect 152 which engages a second planetary gear member 154, in turn, keyed to one end of a main drive shaft 156. The main drive shaft 156 further carries toward its other end a drive gear 158 which, in turn, engages the chute pivot or swing gear member 74. The shaft 156 is displaceable downward axially utilizing the clutch lever 72, but is normally forced upward by a spring at location 160. This results in the normal engagement of the gears 150 and 154. As can be seen, rotation of the worm with the elements in the relation pictured results in rotation of the chute swing gear member 74 at reduced speed thereby laterally displacing the rear pivot assembly and attached chute left or right as desired.

In operation, the automated mechanized system of the invention can be readily connected for remote activation as from the truck cab or by activation at the rear of the vehicle near the chute in a well known manner. Operation is normally by push-button so that upon the release of the button when the desired relative lateral position is reached, movement of the chute will stop and as the gears remain engaged, the chute positioned in this manner will remain securely in place. The latch system 120 can also be employed to aid in locking the manual chute in position assuming it stops with the proper holes aligned. It will be recognized that a stepping motor or the like may also be used to drive the positioning system. In this manner, angular positioning of the concrete discharge chute relative to the truck is accomplished and adjusted as necessary readily and without the need to engage a worker who can be otherwise occupied with the distribution of the concrete.

A manual override is also available using the clutch lever 72 to disengage the drive system and allow manual freewheeling adjustment of the chute if desired so that this option remains available. Upon release of the lever 72, the gears will re-engage holding the chute position. The swing gear member 74 is preferably toothed through a full 180° so that a full 180° automated swing range is provided. Of course, the clutch system could also be detanted or operated by a motor or by a fluid cylinder as well. Mechanization would allow an operator to keep a greater distance from gears and other moving parts.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A motor driven discharge chute control system for controlling the lateral position of a concrete discharge chute associated with a transit mixer vehicle comprising:
   (a) a motor for reversibly rotating a motor shaft;
   (b) an output gear mounted and to rotate with an output drive shaft normally engaged to rotate with said motor shaft;
   (c) a chute swing gear member mounted to enmesh with and be angularly displaced in response to the rotation of said output gear; and
   (d) a pivot assembly for carrying one end of a discharge chute directly contacting said chute swing gear member in a manner such that angular displacement of said swing gear member directly pivots said pivot assembly, wherein said pivot assembly is nested in an opening in said swing gear member.

2. A discharge chute control system as in claim 1 including a spring-biased clutch system for manually disengaging said speed reducing gears from said chute swing gear member.

3. A discharge chute control system as in claim 1 including a manually operated, spring-biased clutch system for disengaging said motor from said chute swing gear member.

4. A discharge chute control system as in claim 3 further comprising manual locking means for positively locking said pivot assembly in place.

5. A discharge chute control system as in claim 1 further comprising speed reducing gears connected between said motor shaft and said output drive shaft wherein said speed reducing gears include a first planetary gear having outer and inner toothed rings, said outer toothed ring being connected to be driven from said motor and a second planetary gear mounted to rotate said output drive shaft and spring-biased to be driven by said inner toothed ring of said first planetary gear and wherein said clutch system operates to axially displace said output drive shaft.

6. A discharge chute control system as in claim 1 further comprising manual locking means for positively locking said pivot assembly in place.

7. A discharge chute control system as in claim 1 wherein said motor is a hydraulic motor.

8. A discharge chute control system as in claim 1 further comprising means for starting and stopping said motor remotely.

9. A method of laterally positioning a concrete discharge chute using the motor driven discharge control system of claim 1 in conjunction with a manually-operated, spring-biased clutched system for operation selected from positive positioning and freewheel operation.

10. A concrete transit mixer truck comprising:
    (a) a chassis;
    (b) a driven concrete mixing drum mounted to rotate on said chassis and having a charge and discharge opening therein;
    (c) a system for dispensing concrete from said drum mounted on said chassis including a discharge chute juxtaposed and receiving concrete from said discharge opening; and
    (d) a motor driven discharge chute control system for controlling the lateral disposition of said discharge chute, said system further comprising:
        (1) a motor for reversibly rotating a motor shaft;
        (2) an output gear mounted and to rotate with an output drive shaft normally engaged to rotate with said motor shaft;
        (3) a chute swing gear member mounted to enmesh with and be angularly displaced in response to the rotation of said output gear; and
        (4) a pivot assembly for carrying one end of a discharge chute directly contacting said chute swing gear member in a manner such that angular displacement of said swing gear member directly pivots said pivot assembly, wherein said pivot assembly is nested in an opening in said swing gear member.

11. A discharge chute control system as in claim 10 including a manually operated, spring-biased clutch system for disengaging said motor from said chute swing gear member.

12. A discharge chute control system as in claim 10 further comprising manual locking means for positively locking said pivot assembly in place.

13. A discharge chute control system as in claim 11 further comprising manual locking means for positively locking said pivot assembly in place.

14. A discharge chute control system as in claim 13 wherein said pivot assembly is nested in an opening in said swing gear member.

15. A discharge chute control system as in claim 10 further comprising speed reducing gears connected between said motor shaft and said output drive shaft wherein said speed reducing gears include a first planetary gear having outer and inner toothed rings, said outer toothed ring being connected to be driven from said motor and a second planetary gear mounted to rotate said output drive shaft and spring-biased to be driven by said inner toothed ring of said first planetary gear and wherein said clutch system operates to axially displace said output drive shaft.

* * * * *